July 29, 1941. E. R. SCHROEDER 2,250,554
INDEPENDENT TRUCK ASSEMBLY FOR VEHICLES
Filed May 17, 1939 2 Sheets-Sheet 1
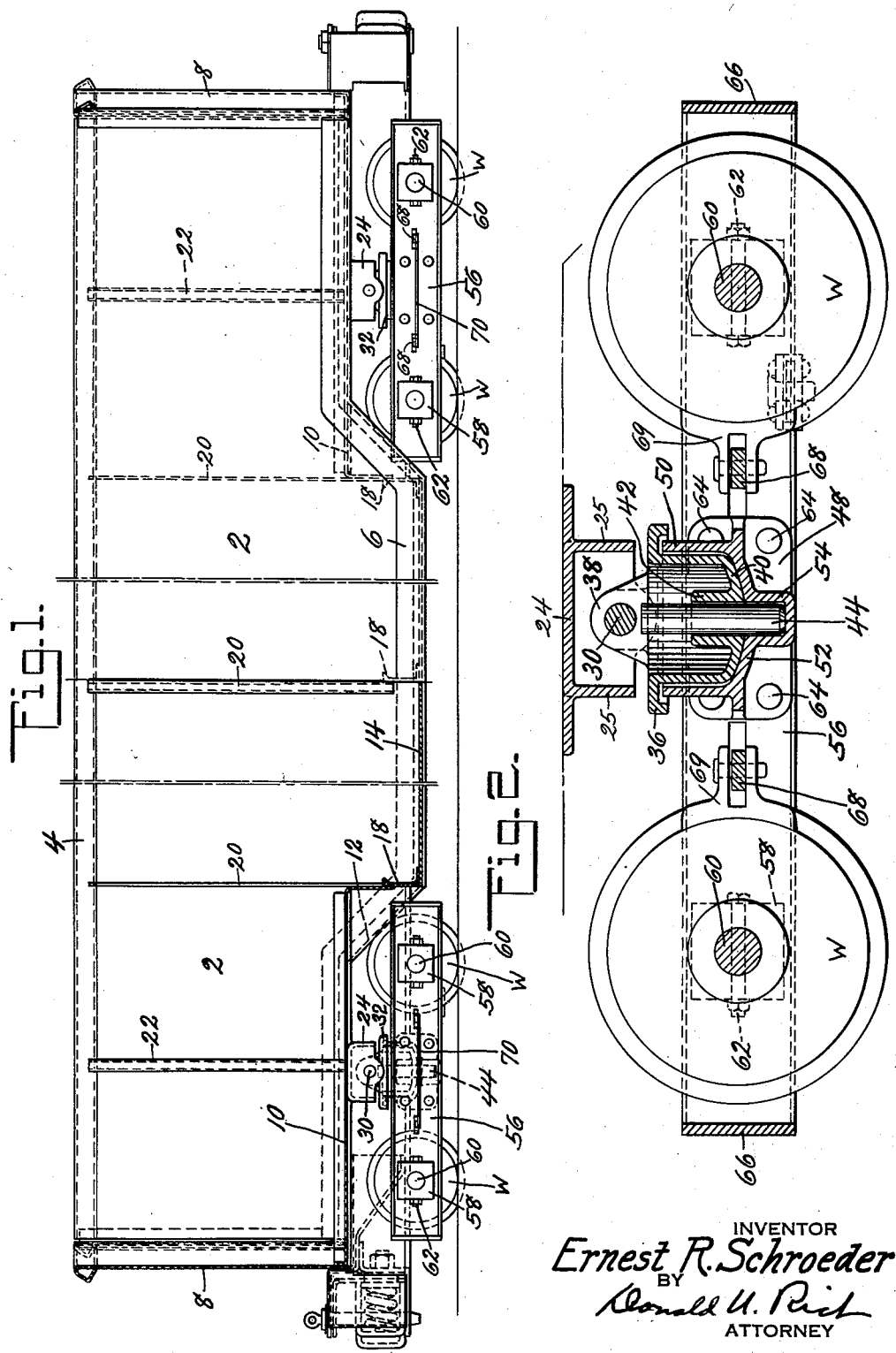
INVENTOR
Ernest R. Schroeder
BY
Donald U. Rich
ATTORNEY

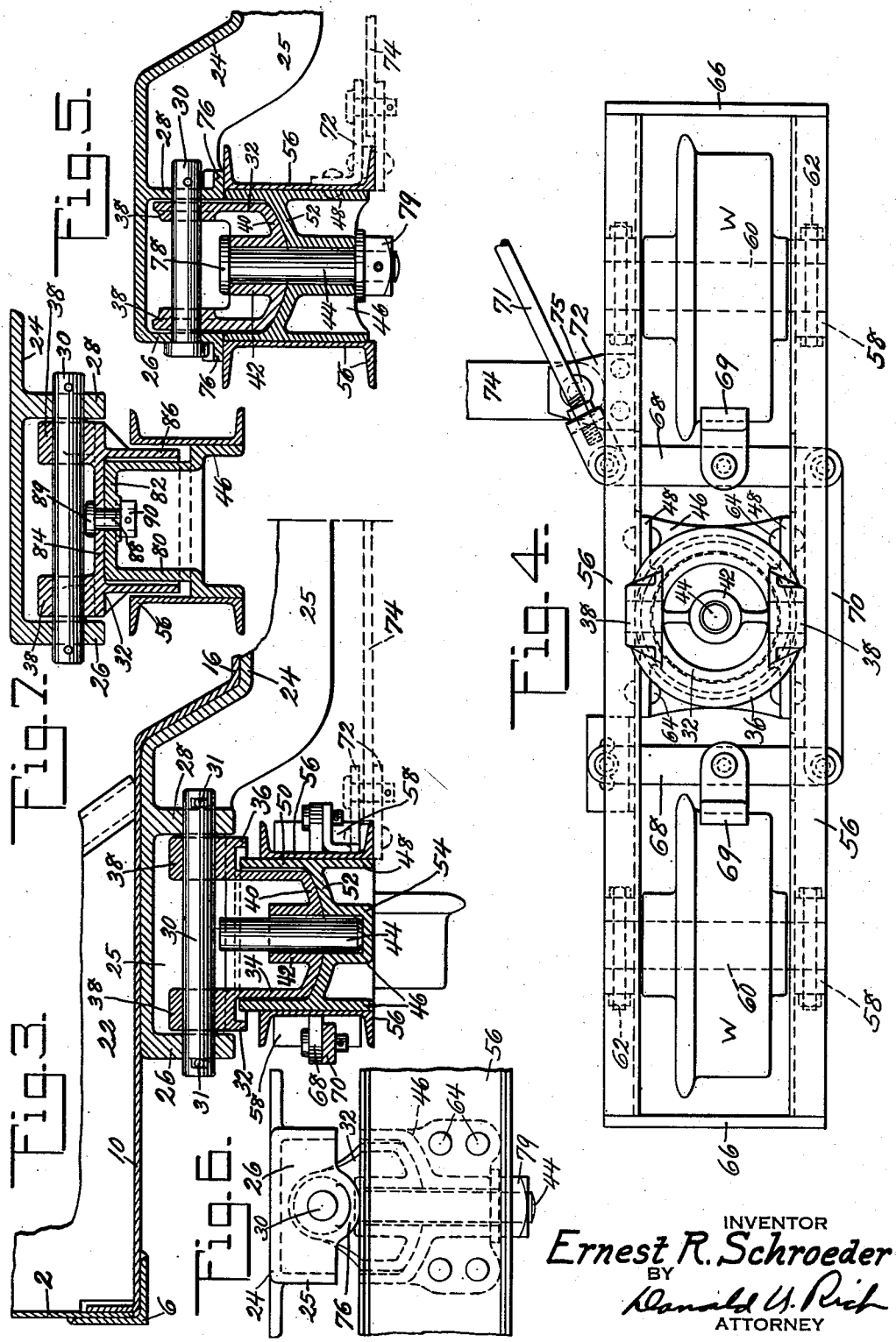

Patented July 29, 1941

2,250,554

UNITED STATES PATENT OFFICE 2,250,554

INDEPENDENT TRUCK ASSEMBLY FOR VEHICLES

Ernest R. Schroeder, Hawthorne, N. J., assignor to American Car and Foundry Company, New York, N. Y., a corporation of New Jersey Application May 17, 1939, Serial No. 274,140

14 Claims. (Cl. 105—179)

This invention relates to vehicles in general and in particular to the large capacity industrial vehicles which must operate over irregular trackage with extremely sharp curves. In the past the majority of industrial cars for use around plants or in mines have been built with short wheel bases permitting their use over the rough tracks and sharp curves existing in the plants or mines. Such short wheel bases necessarily limit the overall length of the vehicle and since the width and height cannot be changed materially, it may be properly said that the capacity of the vehicle is limited by the wheel base permissible. It is an object, therefore, of the present invention to provide a vehicle supported on independent trucks, the distance between which may be increased substantially any amount desired.

A further object of the invention is the provision of an independent truck assembly for vehicles in which the vehicle is supported by means of a limited universal connection to the truck and in which the various pin connections are preferably relieved of the load strain.

A still further object of the invention is the provision of independent truck assemblies universally supporting the vehicle through a joint connection permitting two substantially unrestricted degrees of freedom and a third degree of freedom which is limited.

These and other objects of the invention will be apparent to persons skilled in the art from a study of the following description and accompanying drawings, in which:

Figure 1 is a side elevational view of the improved vehicle with one-half being shown in section, which section is taken substantially on the center line of the vehicle;

Fig. 2 is an enlarged sectional view of the truck with a section taken substantially on the longitudinal center line thereof;

Fig. 3 is an enlarged sectional view disclosing the details of connection between the truck and vehicle body;

Fig. 4 is a plan view of the improved truck and body connected member;

Fig. 5 is a partial sectional view similar to Fig. 3 but showing a modification thereof;

Fig. 6 is a side elevational view of the modification shown in Fig. 5, and

Fig. 7 is an enlarged sectional view similar to Figs. 3 and 5 but showing a further modification thereof.

Referring now to the drawings in detail, it will be seen that the vehicle proper is supported upon a plurality of more or less independent trucks located at each end of the vehicle. The vehicle body in the present instance is formed of girder side walls 2 having top chord 4 connected by the side sheets to the bottom chord 6, which bottom chord is of angular form as clearly shown. The girder side walls extend continuously from end to end of the vehicle and are rigidly connected by any suitable connection means to the end walls 8. In order to increase the load carrying capacity of the vehicle the floor is located on a plurality of levels, the higher of which 10 is located over the trucks and connected by sloping portions 12 to a level 14 positioned between the trucks and as wide as is possible while permitting curving of the trucks. The high level portion over the trucks and the lower level between the trucks is connected to the main low level portion 16 located between the trucks at opposite ends of the vehicle and this extreme low level portion is preferably stiffened by bulb angle transverse members 18 extending from side girder wall to side girder wall. The transverse stiffeners are preferably connected to the upper portions of the girder side walls by means of gussets 20 which will in effect transfer the load from the central portion of the car floor to the side girder walls for transmission through them to the gussets 22 located adjacent the ends of the vehicle and immediately over the body bolsters 24. The body bolsters are preferably formed as a casting although they may be welded or otherwise formed, but in any case they conform to the body floor contour and thus may be termed drop center bolsters since the central portion is below the side end portions. The cast or otherwise formed bolster is preferably of inverted channel section having flanges 25 directed downwardly and joined at their ends by plate 26 as well as inwardly from the ends by an additional plate 28. Each of these connecting plates is drilled and adapted to receive a horizontally disposed bearing means or pin 30 held in place by cotters 31.

The bearing means or pin 30 has mounted thereon intermediate the connecting walls of the bolster a supporting bearing member or rocker member 32. This member is preferably formed as a casting having a cylindrical portion 34 terminating at its upper end in an annular shaped flange 36 adapted to stiffen the cylindrical portion and form a dust guard. Ears or lugs 38 extend upwardly from this annular flange and are pierced to receive the bearing means or pin 30 previously referred to. The lower ends of the cylindrical portion 34 are joined together by a lower bearing wall 40 formed as a segment of a sphere and this lower wall is provided with an opening reenforced by an annular flange 42 adapted to receive a center pin 44. The center pin as clearly shown in the figures is located substantially vertically beneath the bearing pin and is thus held against upward displacement by the bearing pin.

The lower end of the center pin projects into the truck center bearing member 46 which is preferably formed as a single casting having truck frame securing flanges 48 joined together by the bowl like center bearing formed by upstanding flanges 50 and lower partially spherical bearing surface 52 which is interrupted by center pin receiving opening stiffened by closed pocket 54. It will thus be seen that the center pin is held in place by the closed pocket 54 and by the bearing pin 30 previously referred to. The truck frame itself consists of channels 56 having the flanges thereof directed outwardly and adapted to receive therebetween bearing blocks 58. The axle boxes are adapted to receive axles 60 held in the bearing blocks by means of bolts or other means 62 and these axles have mounted thereon the wheels W. The truck side frames are rigidly connected together by the truck center bearing through rivets or other means 64 extending through the channels and flanges of the center bearing and the truck is additionally stiffened by end connecting means 66, thus forming an extremely rigid truck insuring that the axles will remain in fixed relation relative to each other. As clearly shown in Figs. 2 and 4 the truck frame has the webs of the channels slotted in order to receive brake applying levers 68 upon which the brake blocks 69 are supported and these levers are connected to equalizer 70 and pull rod 71. In most cases it is necessary for the trucks on either side of the vehicle to be connected together and this may be done by attaching block 72 to the inner truck side frame and connecting these blocks by means of a tie bar 74 and pin 75. In this manner curving movements of the truck on one side of the vehicle will be transmitted to the truck upon the opposite side of the vehicle at the same end.

In some instances where the loads are extremely heavy it may be desirable to relieve the bearing pin 30 of all or at least the major part of the load strain and this may be accomplished as clearly shown in Fig. 5 by extending the connecting walls 26 and 28 of the bolsters and terminating these walls in outwardly directed flanges 76 formed on an arc concentric with the axis of the bearing pin 30. The extensions are of such a length as to permit the arcuate flanges 76 to rock upon the upper surface of the truck side frames thereby relieving the bearing pin of any load strain. In this form also the truck center bearing instead of terminating in a closed pocket has the lower wall of the pocket removed thereby permitting the use of a bolt type center pin held in position by its head 78 and nut 79. In this manner the supporting bearing member and truck center bearing may be locked together thereby prohibiting any separation of the truck and supporting bearing member. In other words, the truck and body bolster are locked together and cannot separate.

In the form shown in Fig. 7 the truck center bearing is formed with an upwardly directed cylindrical projection 80 providing a substantially flat bearing surface 82. This flat bearing surface is adapted to receive a similar flat bearing surface 84 formed on the supporting bearing member and joined to cylindrical downwardly directed flanges 86 adapted to engage the projection formed on the truck center bearing. In this form the supporting bearing member and truck center bearing may be locked together by means of short center pin 88 held in position by means of its head 89 and nut 90. It is obvious that if desired the center pins shown in Figs. 1 to 7 inclusive may be eliminated since the bearing portions are relatively adapted and so interlocked as to prevent any displacement, but since certain industrial cars are dumped in rotary dumps it is necessary for the trucks to be locked to the car body. Therefore, the locking type of center pins have been shown.

It is obvious that as the vehicle traverses an irregular track the truck assemblies may rock about bearing pins 30 independently of each other, thereby causing each wheel to bear its share of the load regardless of the vertical irregularities appearing in the track. Any curves or horizontal inequalities in the track will be taken care of by the trucks swinging about the center pins on the bearing surfaces provided on the supporting bearing member and truck center bearing. In other words, the horizontal swinging of the truck is taken care of by the bearing surfaces and the center pin is relieved of strain and, in case the form shown in Fig. 5 is used, the bearing means or pin 30 will also be relieved of strain. Any movement of one truck in compensating for horizontal inequalities in trackage will be imparted through the tie bar to the truck upon the opposite side of the vehicle, thus insuring proper functioning of the trucks, particularly as they approach switches and turnouts. It will thus be seen that two degrees of substantially unrestrained freedom are permitted, the truck one in a vertical plane about bearing pin 30, the other in a horizontal plane about the center pin as an axis. It is also desirable to give the truck the limited third degree of freedom and this is permitted by providing clearances between the bearing portions of the supporting bearing member and the truck center bearing as well as between these parts and the center pin, thus the truck may rock slightly relative to the supporting member, allowing the wheels to tilt sufficiently to compensate for varying head contours on the rail and insuring full bearing contact between the wheels and rail head. This slight rocking will also act as a shock absorber in loosening the flange bolt due to lateral movements of the vehicle.

While the invention has been described more or less in detail, it is obvious that various modifications and rearrangements of parts, other than those described, may be made and all such modifications and rearrangements of parts are contemplated as will fall within the scope of the appended claims which define my invention.

What is claimed is:

1. A vehicle including in combination, a body frame, a bolster extending transversely of the body frame, a supporting bearing member located adjacent each end of said bolster, transverse bearing means carried by said bolster and rotatably connecting the latter and supporting bearing member together, a truck associated with each supporting bearing member and including a truck frame, and a truck center bearing carried by said frame, said supporting bearing member and truck center bearing being formed with semi-spherical cooperating bearing surfaces allowing relative rotation between said center bearing and supporting member and a vertical pin carried by said center bearing and extending through said supporting bearing.

2. A vehicle including in combination, a body frame, a bolster extending transversely of the body frame, a supporting bearing member located adjacent each end of said bolster, substantially horizontally disposed bearing means carried by said bolster and rotatably connecting the latter and supporting bearing member together, a truck associated with each supporting bearing member and including a truck frame formed by spaced side members, a truck center bearing joining said side members together substantially at the center thereof, wheels rotatably carried by the frame between the side members adjacent the ends thereof, said center bearing and supporting member being formed with cooperating semi-spherical bearing surfaces, and a substantially vertically extending center pin engaging said center bearing and supporting member and located wholly beneath said horizontally disposed bearing means.

3. A vehicle adapted to run on rails and including in combination, a body frame, a supporting bearing member located adjacent the side of the vehicle and substantially above the rail at that side of the vehicle, bearing means carried by said body frame at the sides thereof and rotatably connecting said supporting bearing member and vehicle frame, a truck associated with said supporting bearing member and including a truck frame located wholly beneath a horizontal plane through said bearing means, wheels supporting the frame, a truck center bearing carried by said frame between the wheels, and a center pin rotatably connecting said center bearing and supporting member, said rotatable connections permitting movement of the truck transversely of the rail and in the plane of the rail.

4. A vehicle adapted to run on rails and including in combination, a body frame, a supporting bearing member located adjacent the side of the vehicle and substantially above the rail at that side of the vehicle, horizontally disposed bearing means carried by said body frame at the sides thereof and rotatably connecting said supporting bearing member and body frame, a truck associated with said supporting bearing member and including a truck frame located wholly beneath said horizontally disposed bearing means, wheels resting on the rail and supporting the frame, a truck center bearing connected to the truck frame between the wheels, and a vertically disposed center pin beneath said horizontally disposed bearing means and rotatably connecting said center bearing and supporting bearing member, said rotatable connections permitting movement of the truck transversely of the rail and also in the plane of the rail.

5. A vehicle adapted to run on rails and including in combination, a body frame, a supporting bearing member located adjacent the side of the vehicle and substantially above the rail at that side of the vehicle, horizontally disposed bearing means carried by said body frame at the sides thereof and rotatably connecting said supporting bearing member and body frame, a truck associated with said supporting bearing member and including a truck frame located wholly below said horizontally disposed bearing means, wheels resting on the rail and supporting the frame, a truck center bearing connected to the truck frame between the wheels, and a vertically disposed center pin rotatably connecting said center bearing and supporting member, said rotatable connections permitting movement of the truck transversely of the rail and also in the plane of the rail, and at least one of said connections being formed so as to permit limited rocking of the truck frame upon the tread surfaces of the wheels.

6. A vehicle including in combination, a body frame, bolster means extending transversely of the body frame, a supporting bearing member located adjacent the end of said bolster means, substantially horizontally disposed bearing means rotatably connecting said bolster means and supporting bearing member together, a truck associated with each supporting bearing member and including a truck frame, wheels rotatably carried by the frame adjacent the ends thereof, a truck center bearing carried by said truck frame between the wheels and rotatably supporting said supporting bearing member, and projections on said bolster means adapted to rockably engage said truck frame whereby said horizontally disposed bearing means is relieved of shear strains due to the weight of the vehicle.

7. A vehicle including in combination, a body frame, bolster means extending transversely of the body frame, a supporting bearing member located adjacent the end of said bolster means, substantially horizontally disposed bearing means rotatably connecting said bolster means and supporting bearing member together, a truck associated with each supporting bearing member and including a truck frame, wheels rotatably carried by the frame adjacent the ends thereof, a truck center bearing carried by said truck frame between the wheels and rotatably supporting said supporting bearing member, a center pin rotatably locking said supporting member and center bearing together, and projections on said bolster means adapted to rockably engage said truck frame whereby said horizontally disposed bearing means is relieved of shear strains due to the lading in the vehicle.

8. In combination, a rail vehicle including a frame, a body bolster extending transversely of said frame, said body bolster being provided at each extremity with spaced pairs of vertical plates, transverse pins carried by said plates, independent trucks for association with each body bolster extremity including truck center bearings having tubular upstanding flanges, said truck center bearings being formed with vertical sockets and having adjacent spherical internal bearing faces about said sockets, center pins positioned in said sockets, and means interposed between each of said body bolster extremities and each of said truck center bearings to permit limited relative rotary rocking movement, said means including castings having spherical bearing surfaces for cooperation with the spherical bearing surface of the truck center bearings, vertical guide openings for said center pins, and an annular flange for overlapping the upper edge of the tubular flanges of said truck center bearings.

9. The substance of claim 8 characterized in that the center pins carried by the truck center bearing sockets are disposed vertically and confined in their vertical movement by the transverse pins carried by the bolster extremities.

10. The substance of claim 8 characterized in that the tubular upstanding flanges of the truck center bearings entirely house the pin sockets and the adjacent spherical internal bearing faces.

11. A vehicle adapted to run on rails and including in combination, a body frame, a transverse supporting bearing member located adjacent the side of the vehicle, a truck associated with and supporting said bearing member, said truck including a center bearing having a curved bearing surface, a vertical pin removably carried by said bearing member and extending upwardly of the curved bearing surface, and means interposed between the transverse frame bearing member and the truck center bearing including a body having projections formed with openings for receiving said transverse bearing member and a bearing portion cooperating with the spherical bearing surface about said vertical pin, said vertical pin extending through said body and terminating immediately adjacent said transverse bearing member.

12. A vehicle including in combination, a body frame, bolster means extending transversely of the body frame and provided with substantially horizontally disposed bearing means at the end portions thereof, said bearing means being formed at least in part by spaced plates depending from said bolster means, a supporting bearing member rotatably connected to each of said bearing means, a truck including a truck frame associated with each supporting bearing member, and a truck center bearing carried by said truck frame, said truck center bearing and supporting bearing member being so formed and arranged as to permit relative rotation therebetween.

13. A vehicle including in combination, a body frame, bolster means extending transversely of the body frame, a supporting bearing member located adjacent each end of said bolster means, transverse bearing means formed at least in part by spaced plates depending from said bolster means and rotatably connecting the latter and said supporting bearing members together, a truck including a truck frame associated with each of said supporting bearing members, and a truck center bearing carried by each of said truck frames, said supporting bearing members and truck center bearings being formed with cooperating bearing surfaces permitting relative rotation therebetween.

14. A vehicle including in combination, a body frame, bolster means extending transversely of the body frame, transverse bearing means located at each end portion of said bolster means and formed at least in part by spaced plates depending from said bolster means, a truck including a truck frame for association with each end portion of said bolster means, a truck center bearing carried by said truck frame, and means interposed between each of said transverse bearing means and truck center bearings so formed and arranged as to permit movement of said trucks transversely of the rail and also in the plane of the rail.

ERNEST R. SCHROEDER.